(12) United States Patent
Scholtz et al.

(10) Patent No.: US 7,494,271 B2
(45) Date of Patent: Feb. 24, 2009

(54) POWER-LINE SAG CALCULATION BY WAY OF POWER-SYSTEM STATE ESTIMATION

(75) Inventors: Ernst Scholtz, Raleigh, NC (US);
Reynaldo F. Nuqui, Cary, NC (US);
John D. Finney, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 118 days.

(21) Appl. No.: 11/671,123

(22) Filed: Feb. 5, 2007

(65) Prior Publication Data

US 2008/0189062 A1 Aug. 7, 2008

(51) Int. Cl.
*G01N 25/00* (2006.01)
*G01K 7/00* (2006.01)
(52) U.S. Cl. .................... 374/45; 374/185; 702/130
(58) Field of Classification Search ............. 374/45, 374/185
See application file for complete search history.

(56) References Cited

U.S. PATENT DOCUMENTS

| | | | | |
|---|---|---|---|---|
| 4,420,752 A * | 12/1983 | Davis et al. | ............ | 340/870.17 |
| 4,723,220 A * | 2/1988 | Smith-Vaniz | ................ | 702/62 |
| 5,235,861 A | 8/1993 | Seppa | | |
| 5,517,864 A | 5/1996 | Seppa | | |
| 5,918,288 A | 6/1999 | Seppa | | |
| 5,933,355 A | 8/1999 | Deb | | |
| 6,441,603 B1 * | 8/2002 | Lawry | ......................... | 324/106 |
| 6,523,424 B1 * | 2/2003 | Hayes et al. | ............ | 73/862.391 |
| 2007/0038396 A1 * | 2/2007 | Zima et al. | ..................... | 702/65 |
| 2008/0204054 A1 * | 8/2008 | Wells | ......................... | 324/713 |

FOREIGN PATENT DOCUMENTS

EP 1887673 A1 * 2/2008

OTHER PUBLICATIONS

IEEE Standards Board, IEEE Standard for Calculating the Current-Temperature Relationship of Bare Overhead Conductors, IEEE Std 738-1993, approved Jun. 17, 1993, Cover page-47.
Seppa, et al., Accurate Ampacity Determination: Temperature—Sag Model for Operational Real Time Ratings, IEEE Transactions on Power Delivery, Jul. 1995, pp. 1460-1470, vol. 10, No. 3.
Douglass, et al., Field Studies of Dynamic Thermal Rating Methods for Overhead Lines, IEEE Transmission and Distribution Conference 1999, Apr. 11-16, 1999, pp. 842-851, vol. 2.

(Continued)

*Primary Examiner*—Gail Verbitsky
*Assistant Examiner*—Mirellys Jagan
(74) *Attorney, Agent, or Firm*—Del Zoppo, III; Anthony M. Driggs; Hogg, Daugherty & Del Zoppo Co., L.P.A.

(57) ABSTRACT

A sag calculator (122) computes sag for a span of a section of a power line based at least in part upon a temperature of conductor lines in the line section. A temperature calculator (120) determines the temperature by computing a resistance ascertained through augmented state estimation techniques performed by a state estimator (118). A Supervisory Control and Data Acquisition (SCADA) system (104) acquires data used by the state estimator (118) to compute the resistance.

17 Claims, 2 Drawing Sheets

OTHER PUBLICATIONS

IEEE Task Force "Bare Conductor Sag at High Temperature", Limitations of the Ruling Span Method for Overhead Line Conductors at High Operating Temperatures, IEEE Transactions on Power Delivery, Apr. 1999, pp. 549-560, vol. 14, No. 2.

Fink, et al., Standard Handbook for Electrical Engineers, Oct. 1999, 14-41-14-112, Fourteenth Edition, McGraw-Hill.

Holbert, et al., Prospects for Dynamic Transmission Circuit Ratings, ISCAS 2001. The 2001 IEEE International Symposium on Circuits and Systems, 2001, May 6-9, 2001, pp. III-205-III-208, vol. 2.

Power Technologies, Inc., Increasing Power Transfer Capability of Existing Transmission Lines, presentation, 2003, slides 1-51.

United States Department of Agricultuer Rual Utilities Service, The Mechanics of Overhead Distribution Line Conductors, Bulletin 1724E-152, Jul. 30, 2003, pp. 1-20.

Dale Douglass, Sag-tension Calculation, A Tutorial Developed for the IEEE TP & C Line Design Subcommittee, based on CIGRE WG B2.12 Technical Brochure under Development, Jun. 13, 2005, 33 pages.

* cited by examiner

POWER-LINE SAG CALCULATION BY WAY OF POWER-SYSTEM STATE ESTIMATION

BACKGROUND

The present application relates to monitoring and calculating line sag in electrical power transmission and distribution systems.

Wire conductors in power line sections are typically designed to maintain a certain clearance from vegetation, structures, or other objects, such that a flashover does not occur. Accordingly, designers determine a maximum amount of acceptable sag in connection with the design of power lines, wherein the amount of sag is affected by various factors such as (but not limited to) the temperature of the conductor, ambient temperature, conductor material, weight of the conductor, etc. With more specificity, when power lines are electrically loaded, the temperature of these lines increases as current increases, leading to thermal elongation of the power lines. This thermal elongation results in increased sag per power-line span, which in turn reduces clearance between conductors and objects below.

Recently, devices have been placed locally at specific power line spans to calculate line sag for this span by using local measurements. For example, a mechanical device that measures changes in line tension can be placed at a span of interest. These measured changes in tension can be employed to compute the line temperature at the particular span, which in turn can be utilized to calculate the sag of the power line at the span. In another example, a temperature sensing device has been used to measure surface temperature of the conductor at a specific location on the power line. Again, the sensed temperature can be utilized to compute sag of a power line of the span where the temperature is taken.

In still yet another example, video equipment has been placed proximate to a power line span where sag is desirably determined, such that the video equipment is directed towards a reflective target placed on the power line span. Images generated by the video equipment can then be analyzed to determine sag at the power line span. In a similar system, a Global Positioning System (GPS) receiver has been placed on a certain power line span of interest, such that as the line sag changes the GPS receiver's position in space changes accordingly.

While the use of these systems has proven effective, each of these systems include devices that have been placed locally at a span of interest; therefore, costs are incurred in that installation and maintenance of these devices has to be undertaken at the span of interest. Additionally, power lines may need to be de-energized and taken out of service to install one or more devices of the systems. Still further, these devices positioned locally at spans of interest provide limited information about other spans.

SUMMARY

Aspects of the present application address these matters, and others.

According to an aspect, a method includes estimating a resistance of a conductor line in a line section by way of estimation of an augmented state and computing a temperature of the conductor line based at least in part upon the estimated resistance. The method additionally includes calculating a sag for a span in the line section based at least in part upon the computed temperature.

According to another aspect, an apparatus includes a sag calculator that calculates a sag for a span in a line section based at least in part upon a temperature of conductor lines in the line section, wherein the temperature is determined based at least in part upon a resistance of the line section ascertained by way of combined state and parameter estimation.

According to yet another aspect, a computer-readable medium includes computer-executable instructions for calculating sag for a span of a line section based at least in part upon an estimated temperature of conductor lines in the line section, wherein the temperature is estimated based at least in part upon parameter estimation undertaken with respect to the line section by way of state estimation techniques. The instructions further include storing the calculated sag.

Those skilled in the art will appreciate still other aspects of the present application upon reading and understanding the attached figures and description.

FIGURES

The present application is illustrated by way of example and not limitation in the figures of the accompanying drawings, in which like references indicate similar elements and in which.

DESCRIPTION

Figure 1:
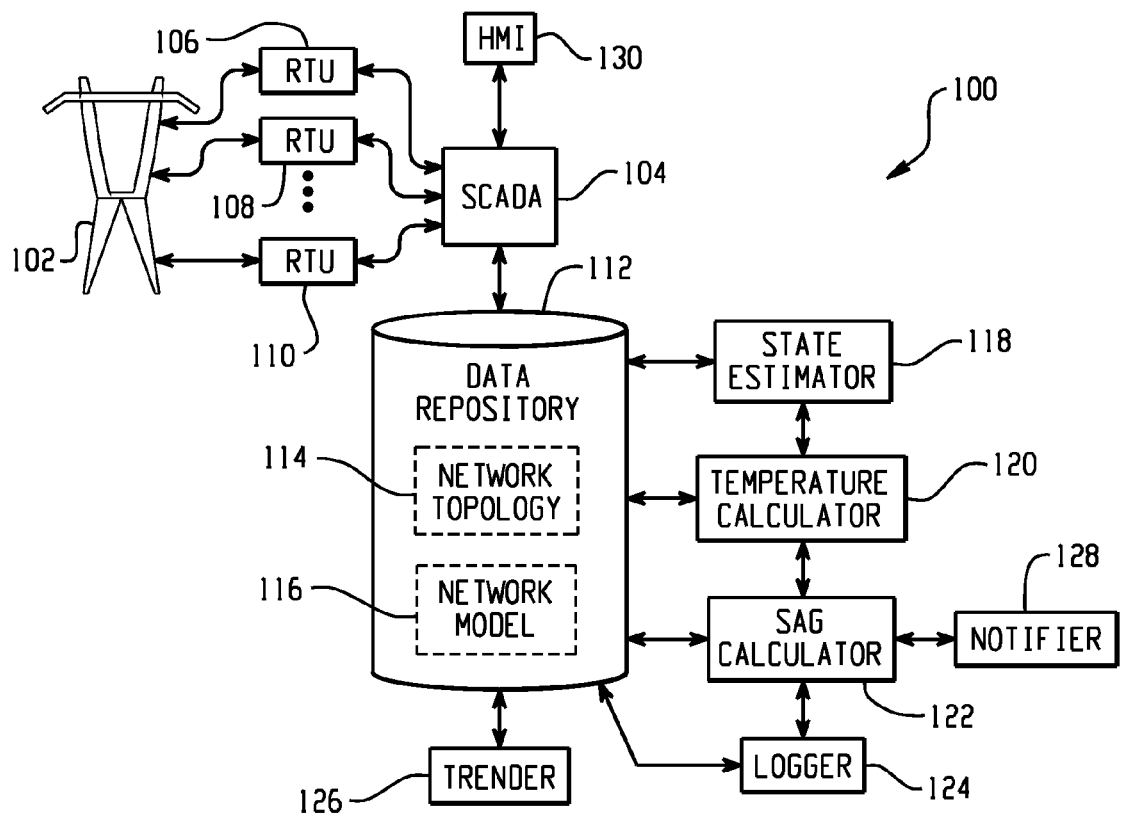
FIG. 1 depicts a system that facilitates computing an estimate of sag for a span of a line section.

With reference to FIG. 1, a framework 100 for calculating line sag through use of augmented state estimation technique(s) (e.g., combined parameter and state augmentation) is illustrated. A power transmission and distribution system includes a plurality of electrical substations, power lines, and other elements 102. A supervisory control and data acquisition (SCADA) system 104 acquires input data from the various elements 102 by way of input/output (I/O) interfaces such as a plurality of remote terminal units (RTUs) 106-110. In the context of system state estimation, the input data typically includes bus voltage and branch current magnitudes, branch power flows, bus power injections, and the like. Additionally, while not shown, phasor measurements can be acquired from one or more phasor measurement units (PMUs). It is understood, however, that PMUs are not necessary to effectuate aspects described herein.

Data acquired by the SCADA system 104 is stored in a data repository 1112, which can be a SCADA system real-time database (RTDB) contained in a suitable computer readable medium or media. The data repository 112 (or other suitable data repository) also includes a network topology 114 (including parameters that are not updatable) and a network model 116, which is updated as a function of information acquired by the SCADA system 104 (such as statuses of circuit breakers, disconnect switches, and positions of transformer taps). A state estimator 118 utilizes data acquired by the SCADA system 104, the network topology 114, and the network model 116 to estimate a state of at least a portion of the power transmission and distribution system, for example using static or dynamic estimation techniques. Further, the state estimator 118 can estimate a state of at least a portion of a power transmission and distribution system through iterative or non-iterative approaches.

Additionally, and as will be described in more detail below, the state estimator 118 augments a state vector for a section of a power line between two nodes (buses) in the power transmission and distribution network with an additional unknown variable (e.g., augmenting the state), wherein the additional unknown variable is representative of a change in resistance from a nominal resistance in the line section (denoted in the network model 116). In an example, the nominal value may be set to zero. The state estimator 118 uses augmented state estimation techniques to estimate the change in state variables and resistance when the electrical loading (utilization) in the system changes. The change in resistance and the nominal resistance value are used by the state estimator 118 to determine a resistance for a conductor line in the line section. More particularly, the state estimator 118 adds the change in resistance to the nominal resistance value to determine a resistance estimate of the conductor wire in the line section. In an example, if the nominal value is set to zero, the state estimator 118 can directly compute an estimate of resistance of the conductor wire in the line section. A temperature calculator 120 receives the estimated resistance of the conductor line and determines a temperature of the conductor line based at least in part upon the resistance. Additionally, if not undertaken by the state estimator 118, the temperature calculator can perform post-processing steps to determine an estimate of resistance for the conductor line (e.g., the temperature calculator 120 can sum the nominal resistance and the change in resistance). A sag calculator 122 computes a sag for the span as a function of the temperature generated by the temperature calculator 120.

The framework 100 may optionally include a logger 124 that stores sags generated by the sag calculator 122 in a computer-readable medium, such as the data repository 112 or other suitable medium. A trender 126 can analyze sags computed by the sag calculator 118 and discern trends in the data. Additionally, a notifier 128 can notify an operator or computer of sags computed by the sag calculator 122. For instance, if an amount of sag is above a threshold, the notifier 128 can generate an alarm in the form of an email, a text message, screen display, or the like. An HMI 130 can be in communication with the SCADA system 104, such that data acquired by the SCADA system may be presented to a user. Additionally or alternatively, the HMI 130 can receive sags computed by the sag calculator 122 and present such sags to an operator. Moreover, while not illustrated, one or more phasor measurement units (PMUs) can generate phasor measurements for one or more line sections in the power transmission and distribution system. Such phasor measurements can be retained within the data repository 112. The state estimator 118 can use the phasor measurements and/or non-phasor measurements to estimate a state of a portion of a power transmission and distribution system as well as estimate resistance of conductor line(s) of interest. Thus, while phasor measurements can be used, they are not required for the state estimator 118 to estimate resistance of the conductor line(s).

Figure 2:
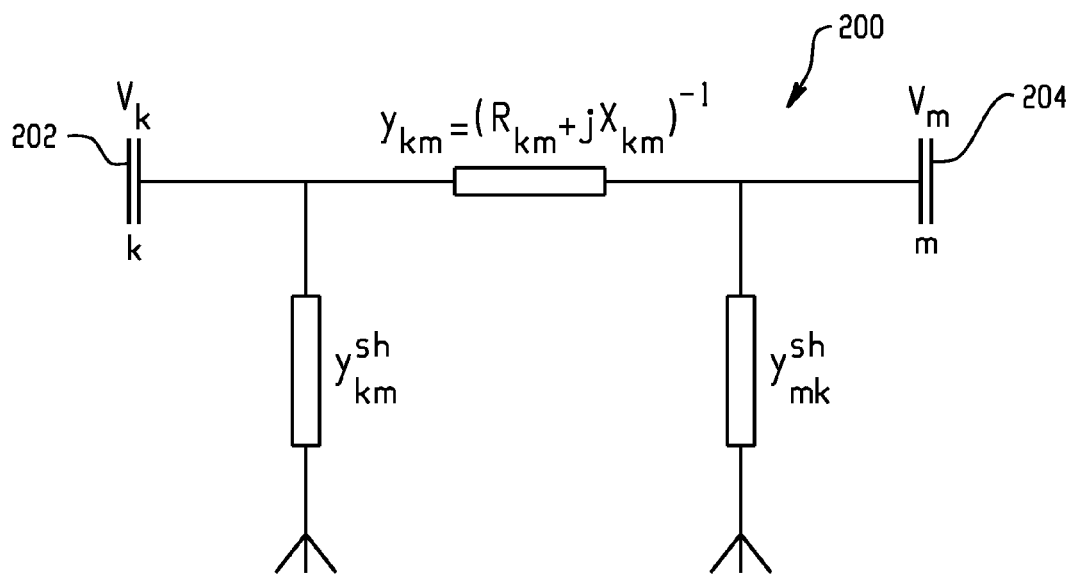
FIG. 2 depicts a circuit that represents a branch between two network buses.

Turning to FIG. 2, and with more detail regarding parameter estimation through augmented state estimation techniques (e.g., estimation of an augmented state), the conventional state vector x is augmented with an additional state variable that represents a change in resistance for each section of a power line of interest 200, where x is the state vector that at least includes a vector of bus voltage angles θ and a vector of bus voltage magnitudes V. It is understood, however, that the state vector can include other information, such as current angles, current magnitudes, power variables, etc. The line 200 is located between two buses or nodes 202 and 204 (buses k and m, respectively). Multiple spans may exist between the buses 202 and 204 or a single span may include the line 200.

The impedance of the line 200 is $R_{km}+jX_{km}$, wherein for the purposes of discussion it can be assumed that the reactance $X_{km}$ of the line does not change noticeably with temperature or electrical loading of the line. The additional state variable corresponds to a change in the resistance value $\Delta R_{km}$ (from a nominal value $\overline{R}_{km}$ used in the network model 116) of the line 200 between the buses 202 and 204, such that $R_{km}=\overline{R}_{km}+\Delta R_{km}$. More particularly, the augmented state vector can be expressed as $x^{avg}=[x^T \; \Delta R_{km}]^T$. Upon performing simultaneous state and parameter estimation, the state estimator 118 (FIG. 1) can ascertain $\hat{x}$ and $\Delta \hat{R}_{km}$, which are estimates of x and $\Delta R_{km}$, respectively. Additionally, as can be discerned from the above, the state estimator 118 can determine a change in resistance with respect to several power lines in the power transmission and distribution system.

The state estimator 118 can use various approaches to determine $\Delta \hat{R}_{km}$. For example, an estimation using a Weighted Least Squares approach or a Kalman Filter can be used in connection with estimating state of at least a portion of a power transmission and distribution system and $\Delta R_{km}$ of the conductor line 202. It is to be understood, however, that any suitable approach (static or dynamic) for combined state and parameter estimation is contemplated by the inventors and is intended to fall within the scope of the hereto-appended claims.

Referring again to FIG. 1, the temperature calculator 120 receives $\Delta \hat{R}_{km}$ generated by the state estimator 118 and receives $\overline{R}_{km}$ (which may be zero) from the network model 116 in the data repository 112. An estimate of resistance for the conductor line between buses k and m at a current temperature $T_1$ of the line can be determined as follows:

$$\hat{R}_{T_1}=\overline{R}_{km}+\Delta \hat{R}_{km}. \quad (1)$$

An estimate of the temperature of the line can then be computed:

$$\hat{T}_1 = \frac{1}{\alpha}\left(\frac{\hat{R}_{T_1}}{R_{T_0}} - 1\right) + T_0; \quad (2)$$

where $\hat{T}_1$ is an estimate of the temperature $T_1$ of the line, α is a coefficient of thermo-resistivity, $T_0$ is a reference temperature, and $R_{T_0}$ is a known resistance of the line at the reference temperature. One or more reference quantities may be supplied by a wire manufacturer.

Figure 3:
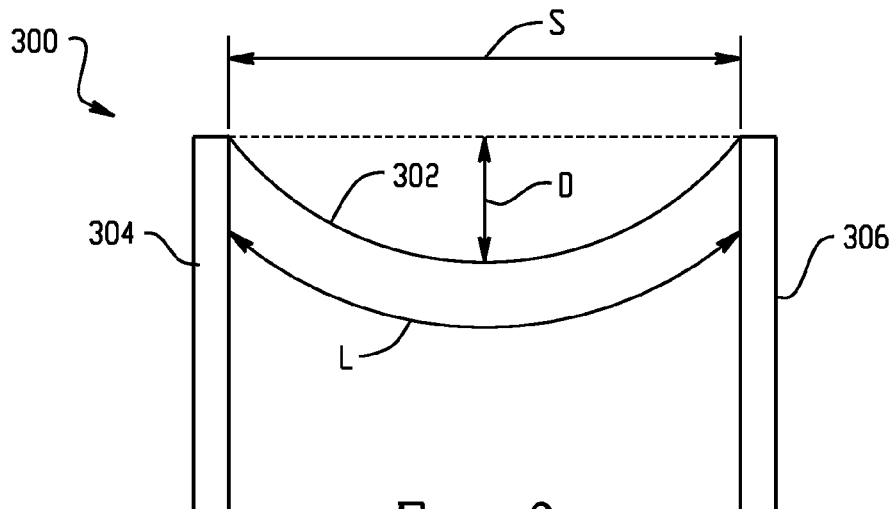
FIG. 3 depicts a span of a line section.

The sag calculator 122 receives the estimated temperature $\hat{T}_1$ and computes a sag for a particular span of interest. Referring briefly to FIG. 3, nomenclature for variables calculated by the sag calculator 122 or employed by the sag calculator 122 in connection with determining sag is illustrated through description of a particular span 300, wherein length of the span is denoted as S. The span 300 includes a conductor line 302 that is supported by two support structures 304 and 306, respectively. The length of the conductor line 302 is denoted as L, and an amount of sag with respect to the span 300 is denoted as D. It is to be understood that a physical power line typically has three wire conductors carrying three phase power in parallel between the support structures 304 and 306 (e.g., at least one wire per phase). Power systems are, to the extent that it is possible, operated in a balanced fashion, and a power line is designed to have all conductors for the three phases be substantially similar in length, resistance, etc. Thus, for the purposes of the present discussion it is sufficient to discuss one conductor as being representative for the composite power line between the support structures 304 and 306.

Turning back to FIG. 1, the sag calculator 122 may take into consideration the interaction between thermal expansion and tension changes in the conductor line between two buses when determining the spans of the line section 102. The data repository 112 retains a reference temperature $T_0$ as well as length $L_{T_0}$ of a conductor section of a particular span in the line section 102 at the reference temperature $T_0$. The length $L_{T_0}$ reflects an equilibrium point of tension and sag characteristics of the line section at the reference temperature $T_0$. Accordingly, when the temperature of the line $\hat{T}_1$ differs from the reference temperature $T_0$, it is desirable to locate an equilibrium tension and sag point with respect to the estimated temperature $\hat{T}_1$.

An adjustment can be made for an effect of non-zero tension on line length to determine such an equilibrium tension/sag point. This adjustment is based at least in part upon a calculation of a zero tension length for a conductor line of a span of interest at the reference temperature $T_0$. The sag calculator 122 can determine this zero tension length as follows:

$$ZTL_{T_0} = L_{T_0}\left(1 + \frac{-H_{T_0}}{(Ec)(A)}\right); \quad (3)$$

where $H_{T_0}$ is the tension in the conductor in the line section at the reference temperature $T_0$, $ZTL_{T_0}$ is the zero-tension length for the conductor line at $T_0$, Ec is Young's Modulus of the material that makes up the conductor section, and A is the cross sectional area of the line conductor.

From the reference length $L_{T_0}$ the equilibrium sag and tension at the reference temperature $T_0$ can be calculated as follows:

$$D_{T_0} = \sqrt{\frac{3S(L_{T_0} - S)}{8}}; \quad (4)$$

$$H_{T_0} = \frac{wS^2}{8D_{T_0}}; \quad (5)$$

where $D_{T_0}$ is an amount of sag of the conductor in the span that corresponds to $L_{T_0}$, S is a length of the span of interest, $H_{T_0}$ is the tension of the conductor section that corresponds to $L_{T_0}$, and w is the weight per unit distance (e.g., pounds per foot) for the conductor material in the line section.

A first length of a conductor section in a span of interest is calculated as follows, wherein, initially, elongation/contraction of the span is calculated without regard to tension:

$$ZTL_{T_1} = ZTL_{T_0}(1+\beta(\hat{T}_1-T_0)); \quad (6)$$

where $ZTL_{T_1}$ is a length of the conductor line at the estimated temperature $\hat{T}_1$ (which corresponds to the zero tension length for the conductor line at $T_0$) and β is the (linear) coefficient of thermal expansion of the material of the conductor line. It can be discerned, however, that the conductor section is associated with an amount of tension, as length of the conductor section has changed.

The sag calculator 122 then computes a first tension that coincides with $ZTL_{T_1}$ in the following manner:

$$ZTD_{T_1} = \sqrt{\frac{3S(ZTL_{T_1} - S)}{8}}; \quad (7)$$

$$ZTH_{T_1} = \frac{wS^2}{8ZTD_{T_1}}; \quad (8)$$

where $ZTD_{T_1}$ is an amount of sag of the span that corresponds to $ZTL_{T_1}$, and $ZTH_{T_1}$ is the first tension of the conductor line that corresponds to $ZTL_{T_1}$.

The sag calculator 122 then computes a second length of the conductor line, wherein the second length is a function of the tension computed in (8). The second length is computed as follows:

$$L_{T_1} = ZTL_{T_1}\left(1 + \frac{ZTH_{T_1}}{(Ec)(A)}\right); \quad (9)$$

where $L_{T_1}$ is a length of the conductor line of the span of interest at the estimated temperature $\hat{T}_1$.

An amount of tension in the line that corresponds to $L_{T_1}$ is then computed by the sag calculator 122:

$$D_{T_1} = \sqrt{\frac{3S(L_{T_1} - S)}{8}}; \quad (10)$$

$$H_{T_1} = \frac{wS^2}{8D_{T_1}}; \quad (11)$$

where $D_{T_1}$ is an amount of sag that corresponds to $L_{T_1}$, and $H_{T_1}$ is an amount of tension that corresponds to $L_{T_1}$.

The first tension in the line is then updated:

$$ZTH_{T_1} = \mu ZTH_{T_1} + (1-\mu)H_{T_1}; \quad (12)$$

where μ is a value that can be determined empirically, such as a value that is proximate to 0.5. The resultant value for $ZTH_{T_1}$ can then be placed into equation (9), and equations (9)-(12) can be repeated until values of $H_{T_1}$ and $L_{T_1}$ converge. For instance, over two iterations the value of $H_{T_1}$ may not change by a particular value and the value of $L_{T_1}$ may not change by a certain value. Upon these values converging within a specified range, the sag calculator 122 can output an estimate of sag for the span of interest, wherein the sag is computed by way of equation (10).

While the system 100 has been described in connection with calculating sag for a particular span using an approach that takes effects of tension on line length into account, it is understood that other approaches can be utilized to estimate sag. Pursuant to an example, given an average temperature of the line section 102 from the temperature calculator 120, the sag calculator 122 can use equation (6) to determine a length of conductor line of a particular span i without taking tension into account. In such an instance, $ZTL_{T_1} = L_{T_1}$, and sag can be estimated through use of equation (10).

Additionally, other iterative and non-iterative approaches are contemplated, as well as the use of more elaborate models that capture the relationship between power line length, temperature and tension. For instance the linear relationships in equations (3), (4), (5), and (6) can be substituted with quadratic functions. For the sake of brevity, these more elaborate models will not be discussed, but it is understood that they are contemplated by the inventors and intended to fall under the scope of the hereto-appended claims.

In another example, the sag calculator 122 may compute sag with respect to a span that is representative of other spans between two buses (buses k and m), and thereafter calculate sag of a particular span between the buses based upon the sag of the representative span. The well known (virtual) Ruling Span is an example of such a representative span. Continuing with the virtual ruling span example, length of a virtual ruling span can be computed as follows:

$$S_R = \sqrt{\frac{\sum_{i=1}^{N} (S_i)^3}{\sum_{i=1}^{N} S_i}} ; \qquad (13)$$

where N is a total number of spans utilized in connection with determining the length of the virtual ruling span. Thereafter, an estimate of the sag for the virtual ruling span at a reference temperature $T_0$ (which may differ from the reference temperatures described above) can be calculated as follows:

$$D_{T_0,R} = \text{mean}\left(D_{T_0,i}\left(\frac{S_R}{S_i^2}\right)\right); \qquad (14)$$

where values of $D_{T_0,i}$ are known a priori.

Resulting values for $S_R$ and $D_{T_0,R}$ can be placed in the following equation to determine the length of the conductor line in the ruling span at the reference temperature:

$$L_{T_0,R} = \frac{8D_{T_0,R}^2}{3S_R} + S_R. \qquad (15)$$

The length of the conductor line in the ruling span at a temperature calculated by the temperature calculator 120 may then be determined as follows:

$$L_{T_1,R} L_{T_0,R}(1+\beta(\hat{T}_1 - T_0)); \qquad (16)$$

where β is a coefficient of thermal expansion for the conductor material, which may depend on a value of $T_0$. Alternatively, the sag calculator 122 can utilize the approach described above (where tension is taken into account) to determine a length of the conducting line with respect to the virtual ruling span at the measured/calculated temperature.

A sag of the ruling span given a temperature ascertained by the temperature calculator 120 can be determined as a function of the length of the conductor line (of the virtual ruling span) at the estimated temperature and the length of the virtual ruling span:

$$D_{T_1,R} = \sqrt{\frac{3S_R(L_{T_1,R} - S_R)}{8}}. \qquad (17)$$

The sag calculator 122 can then calculate sag for any particular span i between buses k and m based at least in part upon a computed sag of the virtual ruling span:

$$D_{T_1,i} = D_{T_1,R}\left(\frac{S_i}{S_R}\right)^2. \qquad (18)$$

As can be discerned from the above, the sag calculator 122 can compute sag as a function of an estimate of temperature of a conductor line between two buses determined by way of simultaneous state and parameter estimation and parameters of the line of interest that are retained within the data repository 112. Thus, the calculations undertaken by the sag calculator 122 are not necessarily dependent upon data from devices that are locally fixed at a particular span. In other words, sag can be computed for multiple spans without requiring specialized devices to be placed at every span of interest. Additionally, the sag calculator 122 can take mechanical creep of conductors into account when computing sag of a span of interest.

Calculated sag generated by the sag calculator 122 can be received by the logger 124, which logs calculations of sag within the data repository 112, another data repository (not shown), or distributes computed sags across several data repositories. The logger 124 can index calculations of sag by time, bus(es), span, or the like. The trender 126 analyzes the indexed data and, for instance, generates predictions for sag based upon current computed sag and previously computed sags, corresponding temperatures, current loads on a power line of interest, prospective loads on the power line of interest, changes in temperature with respect to time, etc. The trender 126 can employ various machine learning techniques and systems in connection with discerning patterns within the logged data, including artificial neural networks, Support Vector Machines (SVMs), Bayesian networks, k-nearest neighbor techniques, amongst others.

The notifier 128 also receives sag calculated by the sag calculator 122 and can notify an operator if, for instance, a computed sag is above a threshold. In another example, the notifier 128 can, from time to time, transmit notifications to an operator by way of the HMI 130. Additionally, while not illustrated as such, the notifier 128 can be in communication with the trender 126, and can transmit notifications to the HMI 130 based upon patterns ascertained by the trender 126 or predictions output by the trender 126. The notifications output by the notifier 128 can be any suitable notifications, including emails, text messages, voice messages, alarms, etc.

Additionally, while shown as being external to the SCADA system 104, it is to be understood that at least the state estimator 118, the temperature calculator 120, and the sag calculator 122 can be placed within the SCADA system 104 and/or an Energy Management System (EMS). In other words, SCADA systems and EMS systems can be designed to include functionality described in connection with the state estimator 118, the temperature calculator 120, and the sag calculator 122. For instance, one such implementation embeds functionality of the state estimator 118, the temperature calculator 120, and the sag calculator 122 inside Energy Management System applications.

It is to be understood that the modules shown and described herein can be hardware, software, or a combination thereof. For instance, the modules may be computer programs retained within memory of a device which are executable by a processor with access to the memory. Additionally, as utilized in the claims, the term apparatus is intended to encompass several computing devices that perform distributed computing with respect to a single process (e.g., functions of the sag calculator 122) as well as a single computing device that executes a process.

Figure 4:
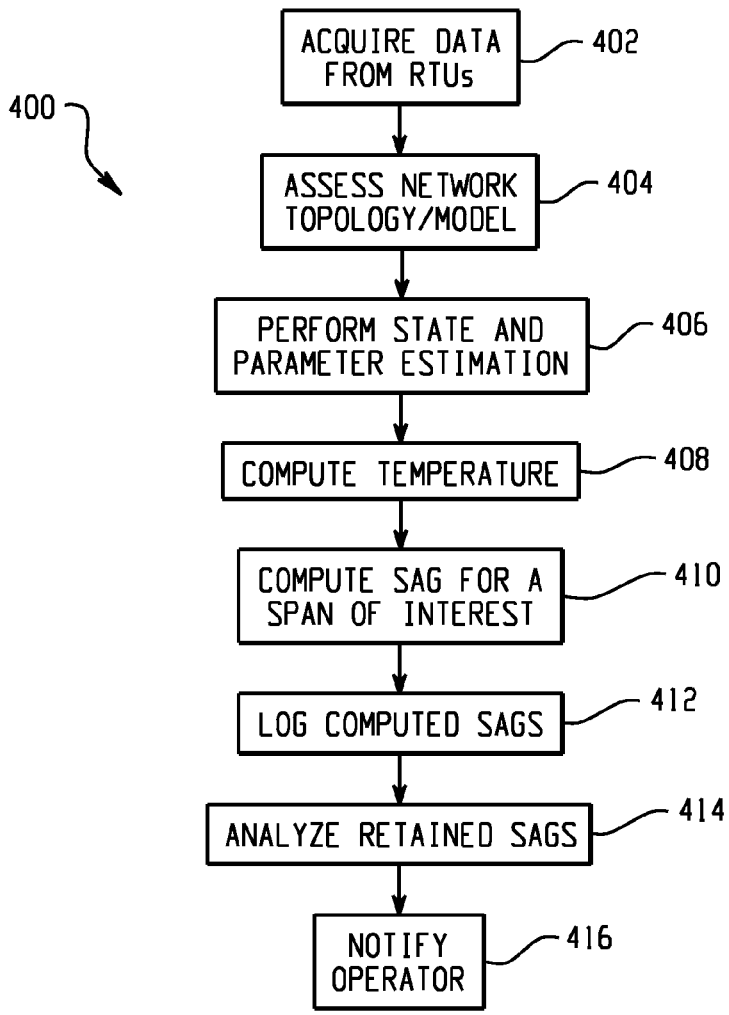
FIG. 4 depicts a method for estimating sag for a span of a line section.

Referring now to FIG. 4, a methodology 400 for computing sag for a span of interest is illustrated. While for purposes of simplicity of explanation the methodology is shown and described as a series of acts, it is understood and appreciated that the claimed subject matter is not to be limited by the order of execution of the acts, as some acts may occur in a different order or concurrently with other acts from that shown and described herein. Moreover, not all illustrated acts may be required to implement a methodology in accordance with the hereto-appended claims.

At 402, data relating to a power transmission and distribution system is acquired, wherein the data can include positions of transformer taps, statuses of circuit breakers and disconnect switches, measurements of branch flows, measurements of loads, measurements of voltage magnitude for various bus sections, etc. At 404, a network model and/or network topology is assessed and updated, if appropriate. At 406, parameter estimation is performed for a line section between two particular buses in connection with determining a resistance for a conductor line in the line section based at least in part upon the acquired data and the assessed network model and/or topology. In an example, iterative state estimation techniques can be utilized in connection with parameter estimation.

At 408, a temperature of the conductor line is computed as a function of the determined resistance, and at 410 a sag for a certain span in the line section is calculated based at least in part upon the computed temperature. At 412, one or more computed sags are logged, and at 414 computed sags are analyzed to determine trends therein. At 416 an operator is notified of one or more computed sags or trends.

Instructions described herein can be retained within memory of one or more computing devices and executed by one or more processors. Additionally, calculated estimates of sag may be stored on a Supervisory Control and Data Acquisition (SCADA) system, an Energy Management System (EMS), or other suitable system utilized in power transmission and distribution systems. Additionally, calculated estimates of sag may be stored upon user devices, such as a personal digital assistant, a personal computer, a server, etc., and output to a monitor, a printer, a speaker, etc.

Of course, modifications and alterations will occur to others upon reading and understanding the preceding description. It is intended that the invention be construed as including all such modifications and alterations insofar as they come within the scope of the appended claims or the equivalents thereof.

What is claimed is:

1. A computer-implemented method comprising the following computer-executable acts:
   estimating a resistance of a conductor line in a line section by way of estimation of an augmented state;
   computing a temperature of the conductor line based at least in part upon the estimated resistance; and
   calculating a sag for a span in the line section based at least in part upon the computed temperature.

2. The method of claim 1, wherein estimating the resistance of the conductor line comprises estimating a change in resistance from a nominal value retained in a network model.

3. The method of claim 1, further comprising updating a network model, wherein the resistance is estimated based at least in part upon parameters in the network model.

4. The method of claim 1, wherein estimating the resistance of the conductor line comprises estimating a state of an electrical power transmission and distribution system, and father wherein the augmented state estimation techniques are used to determine a change in resistance of the conductor line.

5. The method of claim 1, wherein calculating the sag for the span comprises computing the sag for the span based at least in part upon a relationship between thermal expansion and tension of the conductor line in the span.

6. The method of claim 1, further comprising computing multiple sags for multiple spans in a power transmission and distribution system based at least in part upon a state estimate of a subset of the power transmission and distribution system.

7. The method of claim 1, wherein the act of estimating the resistance includes estimating the resistance by way of combined state and parameter estimation.

8. The method of claim 1, wherein the act of estimating the resistance includes estimating the resistance by way of state estimation.

9. The method of claim 1, wherein the augmented state estimation techniques are iterative estimation techniques.

10. The method of claim 9, wherein estimating the resistance of the conductor line comprises performing state estimation using Kalman filters.

11. The method of claim 1, wherein calculating the sag for the span comprises computing a zero tension length for the conductor line in the span at a reference temperature as a function of a known length of the conductor line in the span at the reference temperature and a cross sectional area of the power-line conductor.

12. The method of claim 11, wherein calculating the sag for the span comprises computing a first length of the conductor line in the span at the received temperature as a function of the zero tension length for the conductor line in the span at the reference temperature, a coefficient of thermal expansion for a material of the conductor line, and a difference between the reference temperature and the received temperature.

13. The method of claim 12, wherein calculating the sag for the span comprises calculating a first tension of the conductor line in the span at the received temperature based at least in part upon a weight per unit length of the conductor line, a length of the span, and the computed first length of the conductor line in the span.

14. The method of claim 13, wherein calculating the sag for the span comprises computing a second length of the conductor line in the span at the received temperature as a function of the first length, the first tension, and the cross sectional area of the conductor line.

15. The method of claim 14, wherein calculating the sag for the span comprises computing a sag for the span at the received temperature as a function of the second length.

16. The method of claim 15, wherein calculating the sag for the span comprises computing a second tension of the conductor line in the span as a function of the computed sag of the span, the second length, and the weight per unit length of the conductor line.

17. The method of claim 16, wherein calculating the sag for the span comprises updating the first tension of the conductor line in the span at the received temperature as a function of the first tension and the second tension.

* * * * *